United States Patent [19]

Szwarc

[11] Patent Number: 5,072,441
[45] Date of Patent: Dec. 10, 1991

[54] PACKET SWITCHED INFORMATION NETWORK WITH UNIVERSAL ACCESS TO ENHANCED NETWORK SERVICES

[75] Inventor: Michal Szwarc, Valley Cottage, N.Y.

[73] Assignee: Nynex Corporation, New York, N.Y.

[21] Appl. No.: 563,704

[22] Filed: Aug. 7, 1990

[51] Int. Cl.$^5$ .............................................. H04Q 11/04
[52] U.S. Cl. ...................................... 370/60; 370/94.1;
370/15
[58] Field of Search ............................ 370/60, 94.1, 15

[56] References Cited

U.S. PATENT DOCUMENTS

| 293,850 | 12/1987 | Kolsumata | 370/60 |
| 2,189,112 | 10/1987 | Carter et al. | 370/60 |
| 4,760,395 | 7/1988 | Katreff et al. | 370/60 |
| 4,951,278 | 8/1990 | Biber et al. | 370/94.1 |

Primary Examiner—Douglas W. Olms
Assistant Examiner—T. Samuel
Attorney, Agent, or Firm—Douglas J. Kirk; John J. Torrente

[57] ABSTRACT

An information network for connecting input communication devices using a number of different access protocols to network hosts in which a packet switch is provided for enabling and disabling communication paths betweeen the input devices and hosts and in which an enhanced network function server is able to be used during operation of the packet switch by an enhanced network function access module which permits access to the enhanced function server for the different access protocols.

24 Claims, 10 Drawing Sheets

| | BITS | | | | | | | | |
|---|---|---|---|---|---|---|---|---|---|
| | 8 | 7 | 6 | 5 | 4 | 3 | 2 | 1 | |
| BYTE 0 | 0 | 0 | 0 | 0 | 0 | 0 | 0 | P | |
| BYTE 1 | 0 | 0 | 0 | 0 | 0 | 0 | 0 | 0 | |
| BYTE 2 | 0 | 0 | 0 | 0 | 0 | 0 | 0 | 0 | |
| BYTE 3 | 0 | 0 | 0 | 0 | 0 | 0 | 0 | 0 | |
| BYTE 4 | 0 | 0 | 0 | 0 | 0 | 0 | X | X | ←30 |
| BYTE 5 | CLEAR CAUSE | | | | | | | | |
| BYTE 6 | DIAGNOSTIC CODE | | | | | | | | |
| BYTE 7 | 0 | 0 | 0 | 0 | 0 | 0 | 0 | Y | ←31 |
| BYTE 8 | 0 | 0 | 0 | 0 | 0 | 0 | *C | Z | ←32, 33 |
| BYTE 9 ...... BYTE 15 | DESTINATION * DTE ADDRESS | | | | | | | | ←34 |

PACKET SWITCHED INFORMATION NETWORK WITH UNIVERSAL ACCESS TO ENHANCED NETWORK SERVICES

BACKGROUND OF THE INVENTION

This invention relates to information networks, and, in particular, to an apparatus and method for enabling users, communicating in a variety of standard access protocols, to gain access to the network services.

In a typical information network, users can connect through the network to various network hosts (NHs). These NHs support services and functions that typically are not available at the users' premises and which may require large databases or computer having enhanced speed and computing capabilities Illustrative services provided by present day NHs include banking services, shopping services, travel related services and electronic mail services.

In order to improve information networks, some networks have been provided with enhanced network functions (ENFs) which go beyond the basic transport and connectivity functions of the standard network. For example, some networks have been adapted to include a log-on provision for identifying which user is accessing the network. Typically, a Network User Identification (NUID) is used for this purpose and based on the NUID, the user may be granted access to various NHs while being blocked from others.

Some information networks have also been adapted to provide the user with a menu of available NHs. This permits the user to select NHs as desired. Additionally, to avoid repeating log-on procedures, a number of information networks have been configured to provide an automatic reconnection feature which bypasses the log-on procedure and skips directly to displaying the menu of available NHs.

Another ENF included in some information networks is the ability to log data related to billing. Typical logged data may include the NUID and the connection time to the network and to given NHs. Based upon this data, charges for accessing the information network and charges for using various NHs can be determined.

In a typical information network, a packet switch is used to provide the basic interconnection function between the users of the network and the various NHs. The packet switch communicates through a communications processor (CP) which has a number of distinct access protocol sections. Each access protocol section or handler is configured to handle communication at a corresponding standard access protocol so that users operating with various protocols can utilize the network.

The CP also includes a packet switch interface protocol section which acts as an interface between the access protocol sections and the packet switch. The interface protocol section functions as a protocol converter in two directions. In one direction, messages received from the various access protocol sections are converted by the interface section to the packet switch protocol so that they can be communicated to the packet switch. In the other direction, messages received from the packet switch are converted to the appropriate access protocol so they can be fed to the corresponding access protocol section.

In adapting the above-described information network to provide ENFs, the network has been provided with a module for establishing these functions. This module is referred to as the enhanced network function server (ENFS) and connects to the user through the packet switch. The network has also been provided with a further module which controls access to the ENFS and routing of the user, at appropriate times, to the latter and to the NHs. This module is referred to as the enhanced network function access module (ENFAM).

To date, the ENFAM has been located in the CP of the network and, specifically, in a particular one of its access protocol sections (i.e., the asynchronous protocol section). As a result, users communicating with the network through the other access protocol sections of the CP (e.g. the X.25, ISDN and BISYNC protocol sections) do not have access to the ENFAM and are precluded from communication over the network with NHs using the ENFs.

While providing the ENFAM functionality at each access protocol section of the CP would permit users at the different protocols served by the CP to utilize the ENFS, this would overcomplicate the network and would result in increased cost of the network to the users. Accordingly, it is not a desirable solution to the universal access problem.

It is, therefore, an object of the present invention to provide a information network in which users communicating with the network on various protocols can all access the ENFS of the network.

It is a further object of the present invention to provide an information network as mentioned in the previous object in a less complicated and cost effective manner.

SUMMARY OF THE INVENTION

In accordance with the principles of the present invention, the above and other objectives are realized in a packet switched network of the above type by situating the ENFAM functionality in the packet switch interface protocol section of the CP as opposed to situating it in the one or more of the access protocol sections. In this way, since messages from all access protocol sections must pass through the packet switch interface protocol section of the processor, all users, regardless of their access protocols, will now have access to the ENFAM. Universal access to the ENFs of the network is thus realized is a simple and cost effective manner.

BRIEF DESCRIPTION OF THE DRAWINGS

The above and other features and aspects of the present invention will become more apparent upon reading the following detailed description in conjunction with the accompanying drawings, in which:

FIG. 6 shows in greater detail the user data field of the call request packet of FIG. 5;

DETAILED DESCRIPTION

Figure 1:
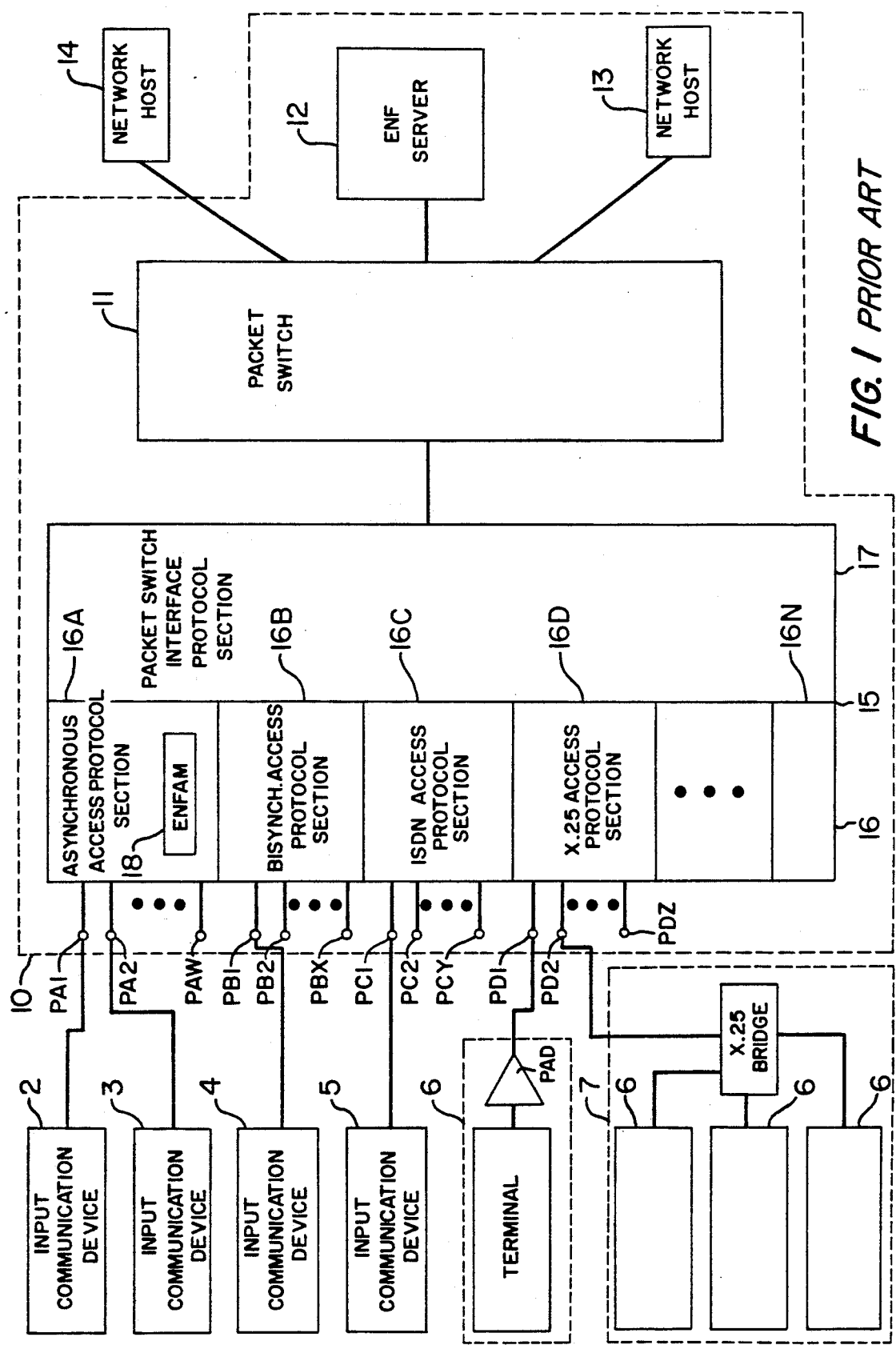
FIG. 1 illustrates a prior art information network adapted to connect input devices at various access protocols to NHs.

FIG. 1 shows a prior art information network 10 adapted to connect to input communication devices which operate on a variety of standard access protocols. As shown, input communication devices 2, 3 operate on an asynchronous access protocol (e.g., X.3 or X.28), input communicating device 4 operates on a BISYNCH access protocol, input communicating device 5 operates on an ISDN access protocol and input comunicating devices 6 and 7 operate on an X.25 access protocol.

In actual practice, each input communicating device might be a single terminal, a combination of terminals or a combination of terminals, devices and networks acting together to enable a user to realize the deisred access protocol. Thus, for example, the device 2 might be a single dumb PC terminal located at a users premises and transmitting and receiving messages on an X.3 protocol. The communicating device 6, on the other hand, might be a network device formed from a dumb X.3 terminal and a standard packet/assembler/disassembler (PAD) which transforms the X.3 protocol messsages to X.25 protocol messages. Likewise, the device 7 might include an X.25 bridge which bridges the outputs of a group of such network devices.

The information network 10 comprises a packet switch 11, an enhanced network function server (ENFS) 12, network hosts (NHs) 13-14 and a communications processor (CP) 15. The CP 15 serves as an interface for the information network 10 and includes a number of access protocol sections 16A ... 16N each for coupling messages to and from certain of the input communicating devices operating on the corresponding protocol. Each section 16A to 16N is illustrated as having several ports for connecting to a number of input devices. In the case shown, the sections 16A-16D are illustrated as having ports each, PA1-PAW, PB1-PBX, PC1-PCY and PD1-PDZ.

In the present embodiment, access protocol section 16A of CP 15 is an asynchrounous access protocol section and communicates with input devices 2 and 3 via ports PA1 and PA2. Access protocol section 16B, in turn, is a BISYNCH access protocol section and, hence, communicates with input device 4 via port PB1. Access protocol sections 16C and 16B are ISDN and X.25 access protocol sections and communicate with the input device 5 and the input devices 6, 7 via ports PC1 and PD1, PD2 respectively. The other sections 16E to 16N of CP 15 can be other standard access protocol sections or may be additional sections handling one or more of the same protocols handled by the sections 16A-16D.

In addition to the access protocol sections 16A-16N, the CP 15 also includes a packet switch interface protocol section 17. The interface protocol section 17 provides an interface between the access protocol sections 16A-16N and the packet switch 11. In particular, the section 17 acts as protocol converter converting the protocol of the messages received at the access protocol sections 16A to 16N to the packet switch interface protocol for communication to the packet switch 11 and similarly converting the messages from the packet switch to the appropriate access protocols for the access protocol sections 16A-16N.

The packet switch 11 has multiple communication channels capable of communicating at the packet switch interface protocol (for example X.25 and X.75). The packet switch 11 provides virtual connections and routing between devices connected to its communication channels.

The NHs 3-4 are independent computer based systems that provide various services. Thus, the NHs might provide: banking services, catalog and shopping services, data base services, and electronic mail services. Communication between the NHs and the switch 11 are at the packet switch interface protocol (either direct or through a communications processor). The NHs may be designed and supported by third parties (e.g., NH 14) or by the company supporting the information network 10 (e.g., NH 13).

As above-indicated, the network 10 is provided with an ENFS 12 which provides enhanced network functions (e.g., log on, NH menu, billing data) for the network beyond its standard connectivity and transport functions. Access to the ENFS 12 and, hence, these enhanced network functions (ENFs), is through an enhanced network function access module (ENFAM) 18 which is situated in the asynchronous access protocol section 16A of the CP 15. The ENFAM 18 provides the requisite control functionality for a communication session between the input devices to which it is available, the packet switch 11 and the ENFS 12.

Figure 2:
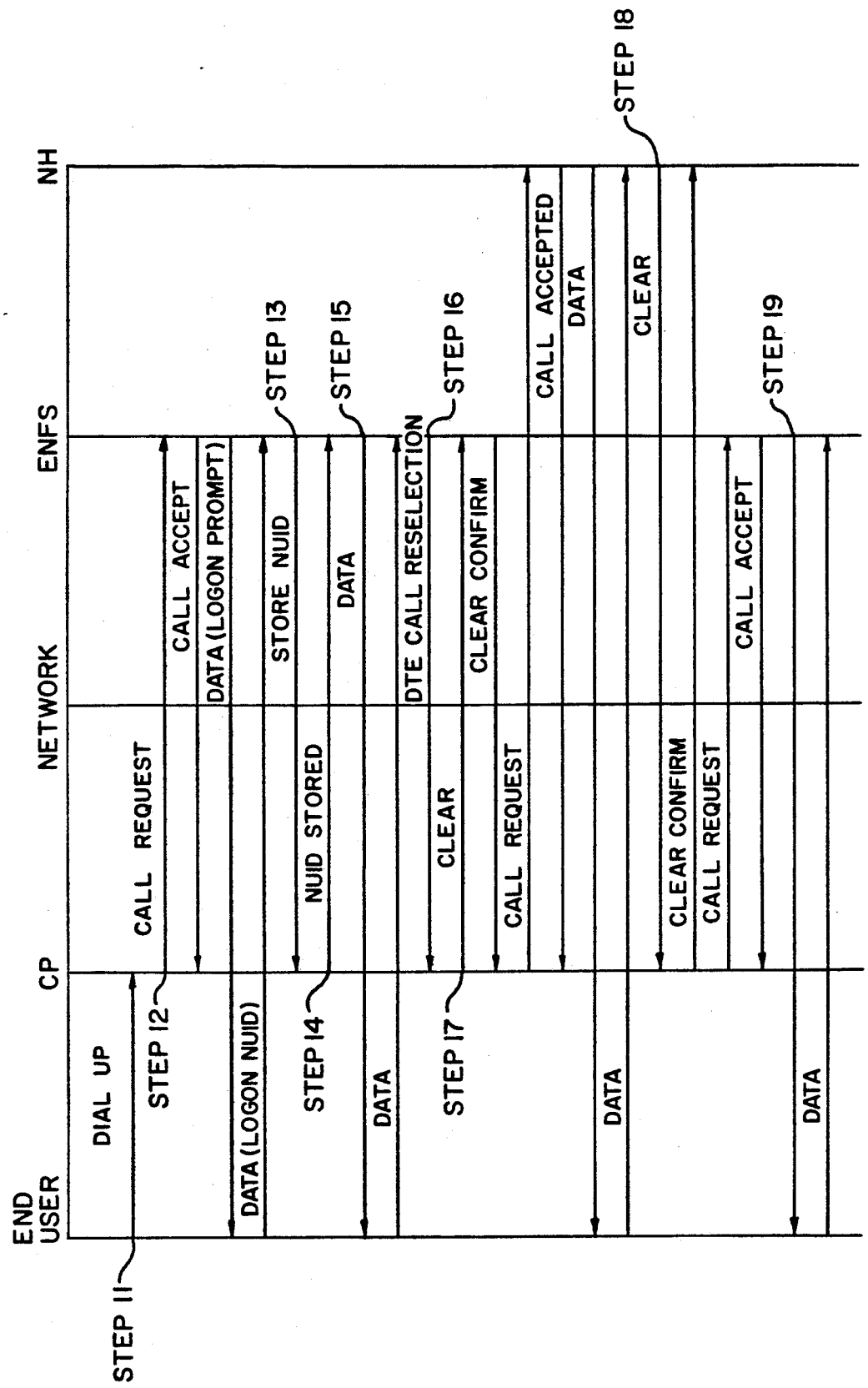
FIG. 2 shows the communication flow or sequence between the input devices, the CP, the ENFAM, the packet switch and the NHs in the information network of FIG. 1.

FIG. 2 illustrates the functions performed by ENFAM 18 and typical ENFs provided by the ENFS 12, during a communication session with the input communication device 2.

In step 11—the device 2 connects to the CP 15 in response to user dial up.

In step 12—the ENFAM 18, acting through the asynchronous access protocol section 16A and packet switch interface protocol section 17, instructs the packet switch 1 to establish a virtual communication connection between the access protocol section 16A and the ENFS 12. The ENFAM 18 transfers to the ENFS 12 through the protocol sections 16A and 17 a call request packet containing a specific event marker identifying this as a new call (the first one by the currently connected device 2). The ENFS 12 responds by transmitting a call accepted transmission through the switch 11 and protocol sections 17 and 16A to the ENFAM 18. The packet switch 11 then establishes a virtual circuit between the ENFS 12 and input device 2 via CP 15 protocol sections 16A and 17 and supplies a log-on prompt, according to a predetermined protocol, to the device. The device 2 responds with the NUID.

In step 13—The ENFS 12 delivers data conveying billing information to the ENFAM 18. This special "Q-bit ON" packet the user's billing number (shown as the NUID) and other user related information.

In step 14—The ENFAM 18 verifies receipt by transmitting a confirmation packet identical to the "Q-bit ON" packet received. Within the ENFAM 18, the user's billing number and other information is placed in a journal record produced for each call by the user.

In step 15—The ENFS 12 provides the device 2 with data which for example, may be a menu of available NHs. The user then selects the desired NH, e.g., the NH 4.

In step 16—The ENFS 12 passes the address of the selected NH and other call facilities selected by the user in the DTE call selection "Q-bit On" packet to the ENFAM 18.

In step 17—The ENFAM 18 instructs the packet switch 11 to disconnect the virtual circuit with the ENFS 12 and to establish a new virtual circuit to the specified NH 4. The device 2 and the NH 4 are now connected and may communicate to perform the desired function.

In step 18—At the end of the session between the device 2 and the NH 4, the virtual circuit between the two is terminated. The ENFAM 18 transmits a Call Request to the ENFS 12 with the Call Marker set to "call return". This indicates that the user is returning to the network to perform other functions, so the user does not have to be validated again.

In step 19—The returning user interacts with the ENFS 12 and can establish a connection to yet another NH or terminate the session with the information network.

As above-noted, the ENFAM 18 is located in the asynchronous access protocol section 16A of the CP 15. As a result, the ENFAM 18 is only available to the input communication devices communicating with this section of the CP. Thus, only the devices 2, 3 can have access to the ENFAM 18 and, through the ENFAM 18, the ENFS 12 when communicating with a NH. The other input communicating devices, i.e., those connected to the access protocol sections 16B-16N of the CP 15, therefore, are left to communicate with the NHs only via the normal connectivity and transport functions of the packet switch 11. These devices hence, are without access to the ENFS 12 and the ENFs provided thereby.

Figure 3:
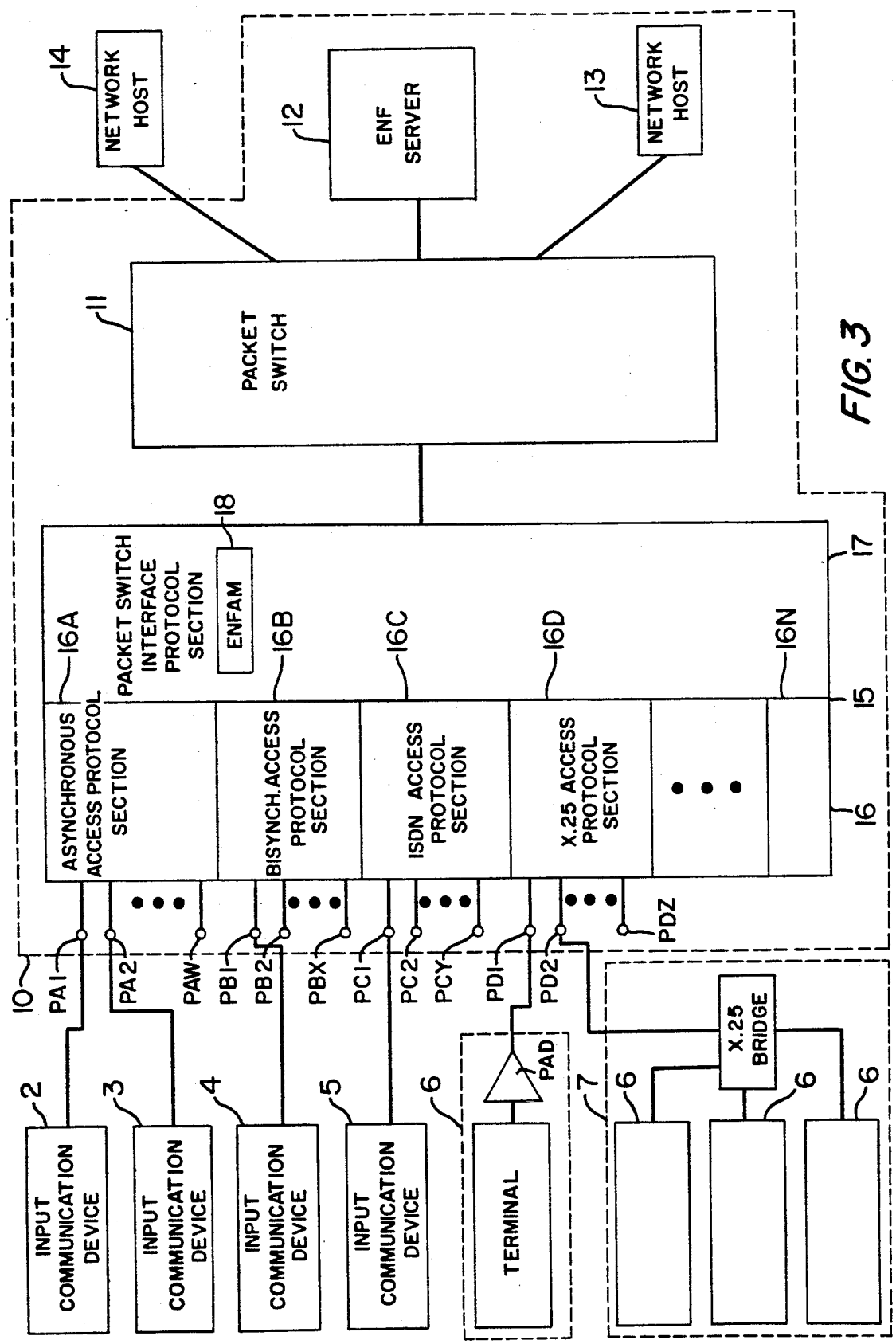
FIG. 3 illustrates an information network adapted to connect input devices at various access protocols to NHs in accordance with the principles of the present invention.

In accordance with the principles of the present invention, the information network 10 is further adapted to allow all the input communicating devices, regardless of their access protocols, to access the NHs via the ENFAM 18. This makes the ENFS 12 available to all input devices, providing universal access to the ENFs. This universal access is accomplished by adapting the information network 10 so that the ENFAM functionality is situated on the packet switch interface protocol side of the network. In the case shown, this is realized by locating the ENFAM 18 in the packet switch interface protocol section 17 of the CP 15. FIG. 3 shows the information network of FIG. 1 adapted in this manner.

Thus, as shown, the ENFAM 18 is now located in the section 17 of the CP 15. This permits access to the ENFAM by all the access protocol sections 16A to 16N and, therefore, the input devices connected to these sections.

Figure 4:
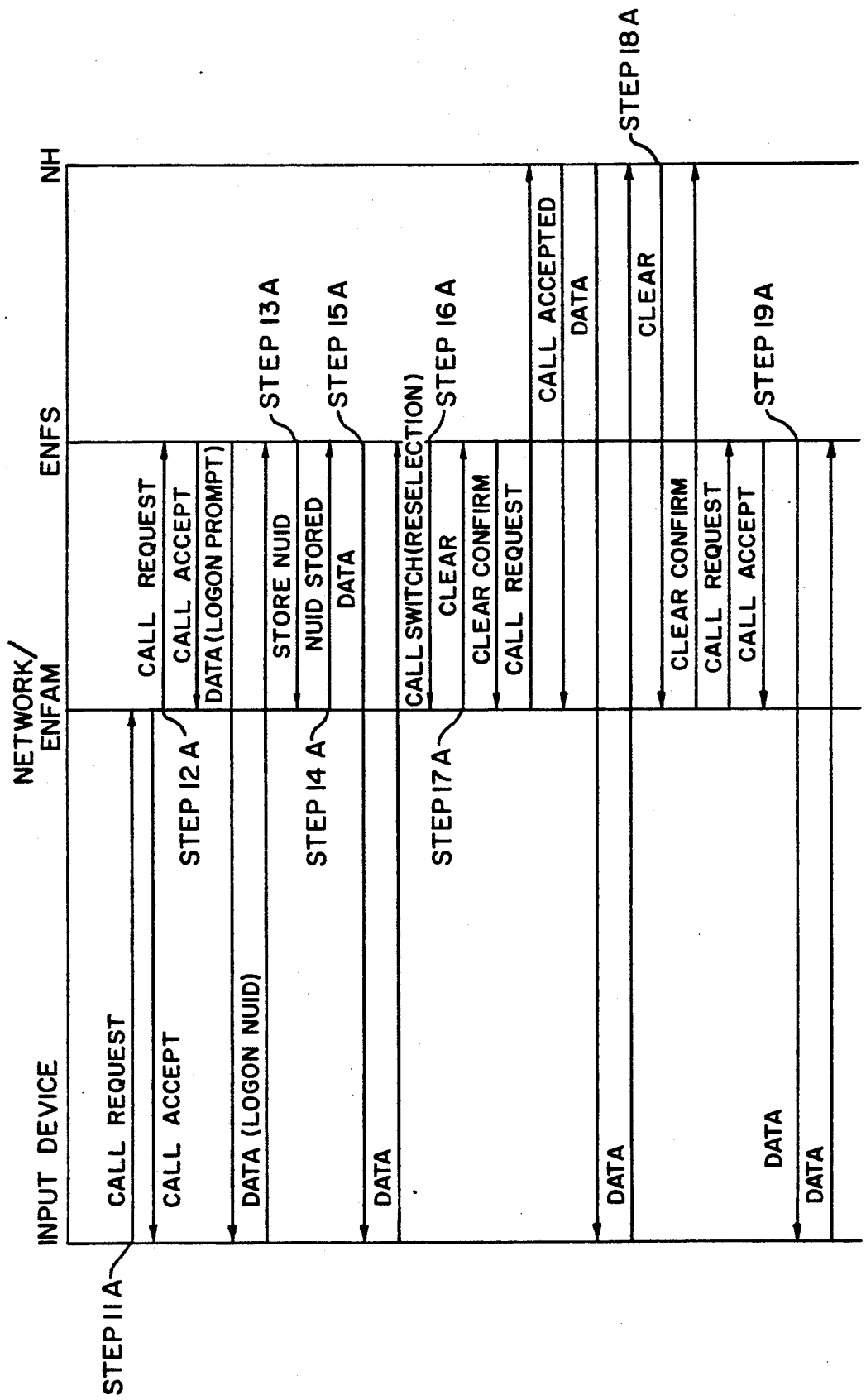
FIG. 4 shows the communications flow or sequence between the input devices, the CP, the packet switch and the NHs in the information network of FIG. 3.

FIG. 4. illustrates the functioning of the information network 10 of FIG. 3 and the input device 6 operating on X.25 protocol during a communications session.

In step 11A—Input device 6 initiates a communication session by transmitting a call request to the X.25 access protocol section 16D of the CP 15.

In step 11B, the protocol section 16D of CP 15 transmits a call accpt to establish a session.

In step 12A—The input device 6 transmits an ENFAM 18 call request data packet 19A to the CP 15 which is transferred by the X.25 access protocol section 16D to the packet switch interface protocol section 17. FIG. 6 shows the details of a call request 19A transmission.

As shown, the group 20 and channel 21 fields together form a 12 bit virtual circuit number. The type 22 field is set to pre-selected value of '00001011'. The first bit position 23 of the type field is set to a one to indicate that this is a control block as opposed to a data block. The calling address 26A and the destination address 26B are defined in CCITT recommendation X.121. The facilities field 28 is used to request special features. The user data field 29, of up to 16 bytes, is normally reserved for data entered by the user at selection time. The length of calling address 24, the length of destination address 25 and the facilities length are self explanatory and also need not be discussed further.

Figure 5:
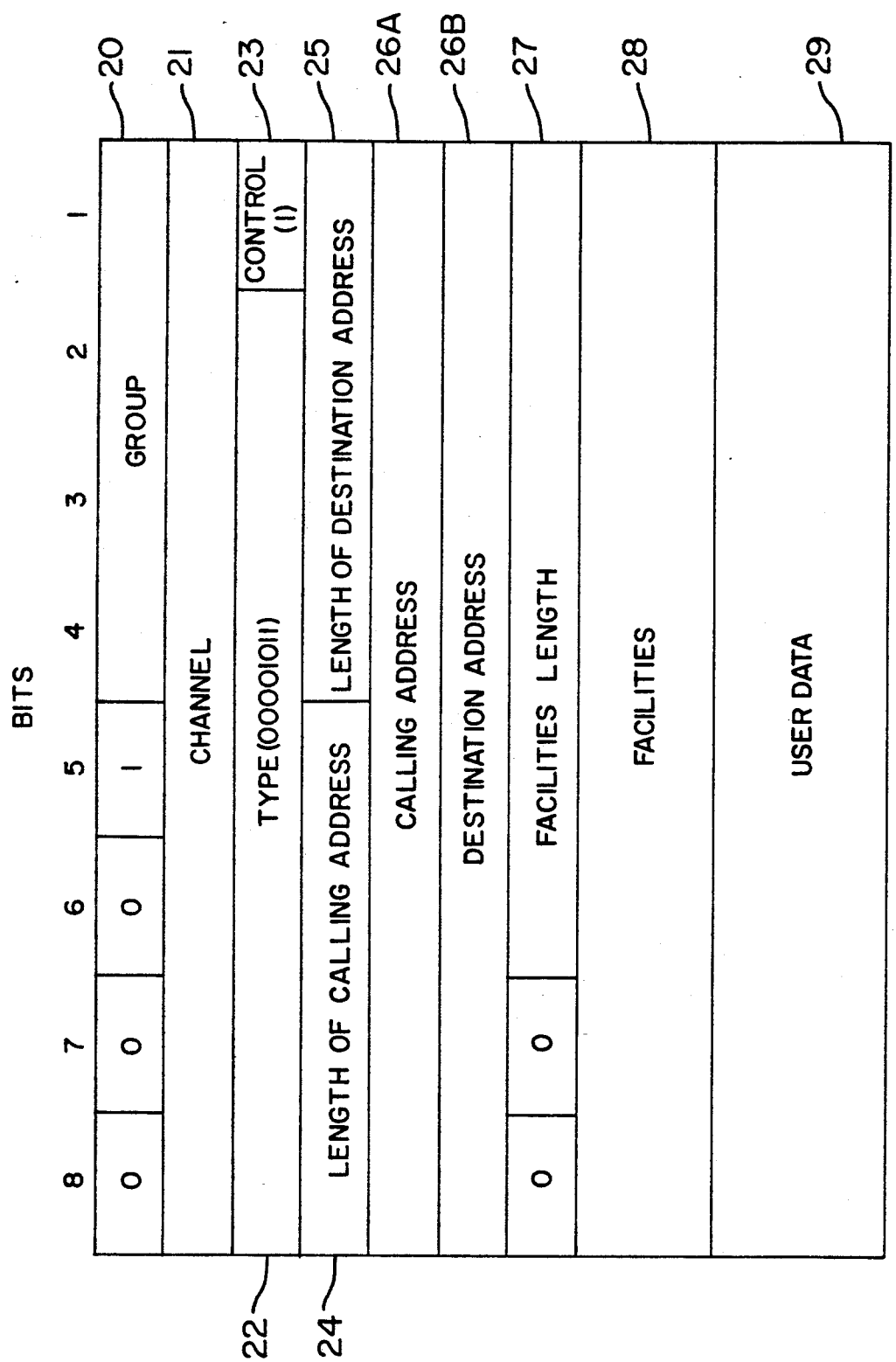
FIG. 5 shows in greater detail a call request packet used in the communication sequence set forth in FIG. 4.

FIG. 6 shows, in more detail, the user data 29 field of the call request of FIG. 5. The user data field 29 consists of sixteen bytes, numbered zero through fifteen. The first two bits in the fourth byte represent a call marker 30. The first bit in the seventh byte represents a local/remote disconnect origination flag 31. The first bit in the eighth byte represents the NH call status 32. The second bit in the eighth byte represents the destination DTE address presence flag 33. Bytes nine through fifteen contain the destination address 34.

Returning to FIG. 4, in step 12A, the ENFAM 18 located within the section 17 of the CP 15, upon detecting the call request 19A from the input device 6, functions to set up connection between the device 6 and the ENFS 12, so that the identity of the device, or the user thereof, can be validated. If the call request 19A contains the address of the ENFS 12 as the destination address 26B, the ENFAM 18 sets the call marker 30 to zero, indicating a first call, and forwards the call request message to the ENFS. However, if the destination address 26B is other than the ENFS 12 location, the ENFAM 18 stores the address in the session control block (a memory location within the ENFAM). The ENFAM 18 then sets the call marker 30 to zero, indicating a first call, and forwards the call request message via the packet switch 11 to the ENFS 12.

The ENFS 12 replies by transmitting a 'call accepted' message to the ENFAM 18. As soon as the call accepted message arrives from the ENFS 12, a virtual circuit is formed by the switch 11 between the input device 6 and the ENFS 12. The ENFS 12 interacts with the input device, to obtain and verify the NUID.

In step 13A, the NUID (or billing number), obtained in step 12A, is transmitted, via a "store NUID Q-bit ON" packet 35 (Q-bit ON), from the ENFS 12 to the ENFAM 18. The ENFAM 18 places the NUID into a billing record.

Figure 7:
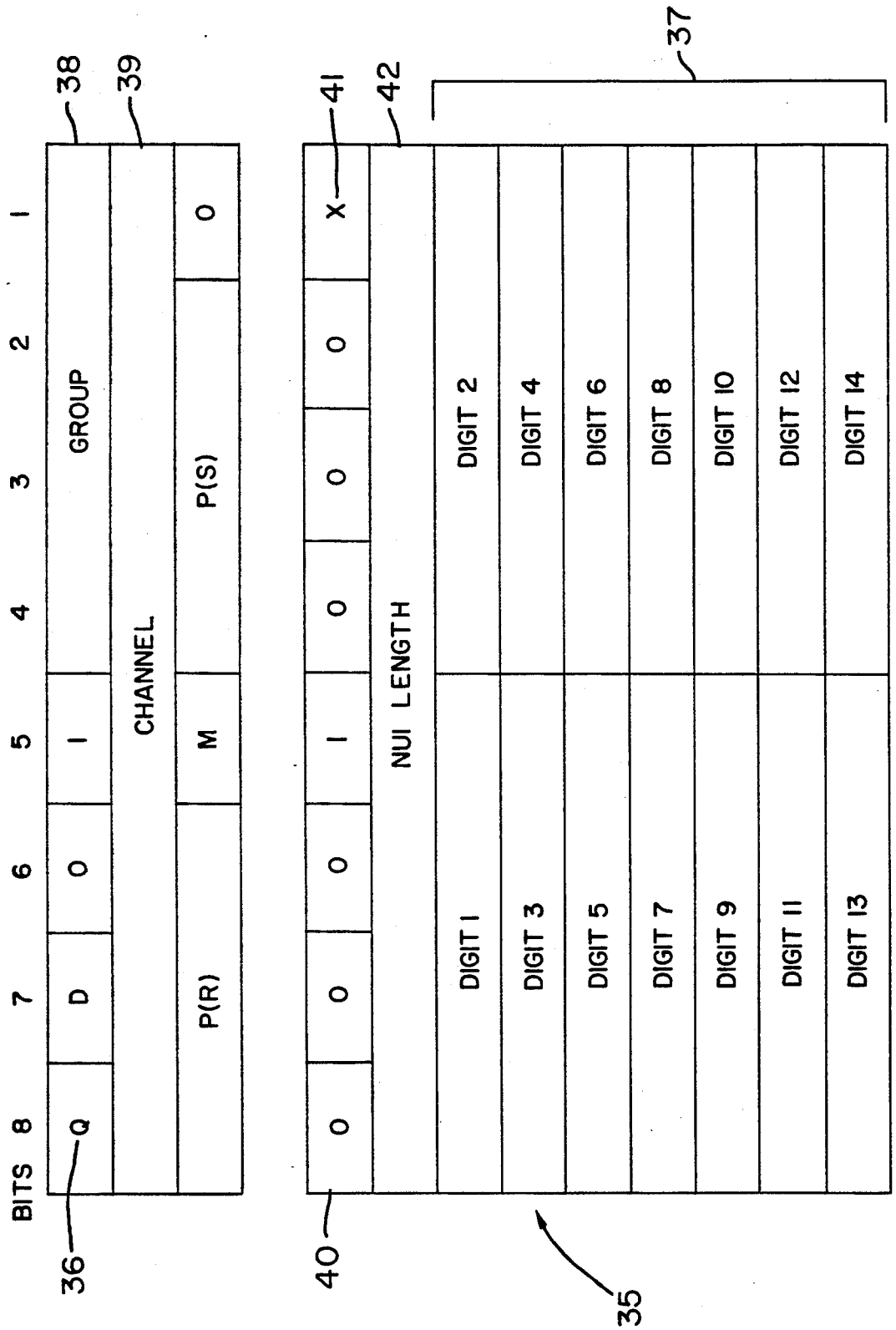
FIG. 7 shows in greater detail the Q-bit ON packet used in the communication sequence set forth in FIG. 4.

FIG. 7 shows the details of a Q-bit ON packet 35. The Q-bit ON packet 35 conforms to the data packet as defined by the X.25 standard. The Q bit 36 is set to a one thereby indicating that qualified data follows. The logical group 38 and logical channel 39 together form a 12 bit virtual circuit number. The type field 40 is set to 000100X with the X bit 41 set to zero indicating a command and one indicating a response. The NUID numbers 37 to be transmitted are contained in a variable number of bytes. The NUID length 42 field indicates how many bytes 37 containing the NUID numbers are to be transmitted.

In step 14A—the ENFAM 18 acknowledges the receipt of the Q-bit ON packet 35 by transmitting a mirror copy of the Q-bit ON packet 35 back to the ENFS 12.

In step 15A—The ENFS 12 provides the input device 6 with a menu of available NHs 3-4. Based upon the NUID number obtained in step 12A, access to certain NHs can be selectively blocked. Those NHs which are blocked will not be shown on the menu, or, will be shown with an explanation as to why they are not available. The user, connected to the network device 6, responds by selecting the desired NH 3-4.

In step 16A—the ENFS 12 transfers the location number of the NH 3-4, selected in step 15A, to the ENFAM 18 via a call switching packet 43.

Figure 8:
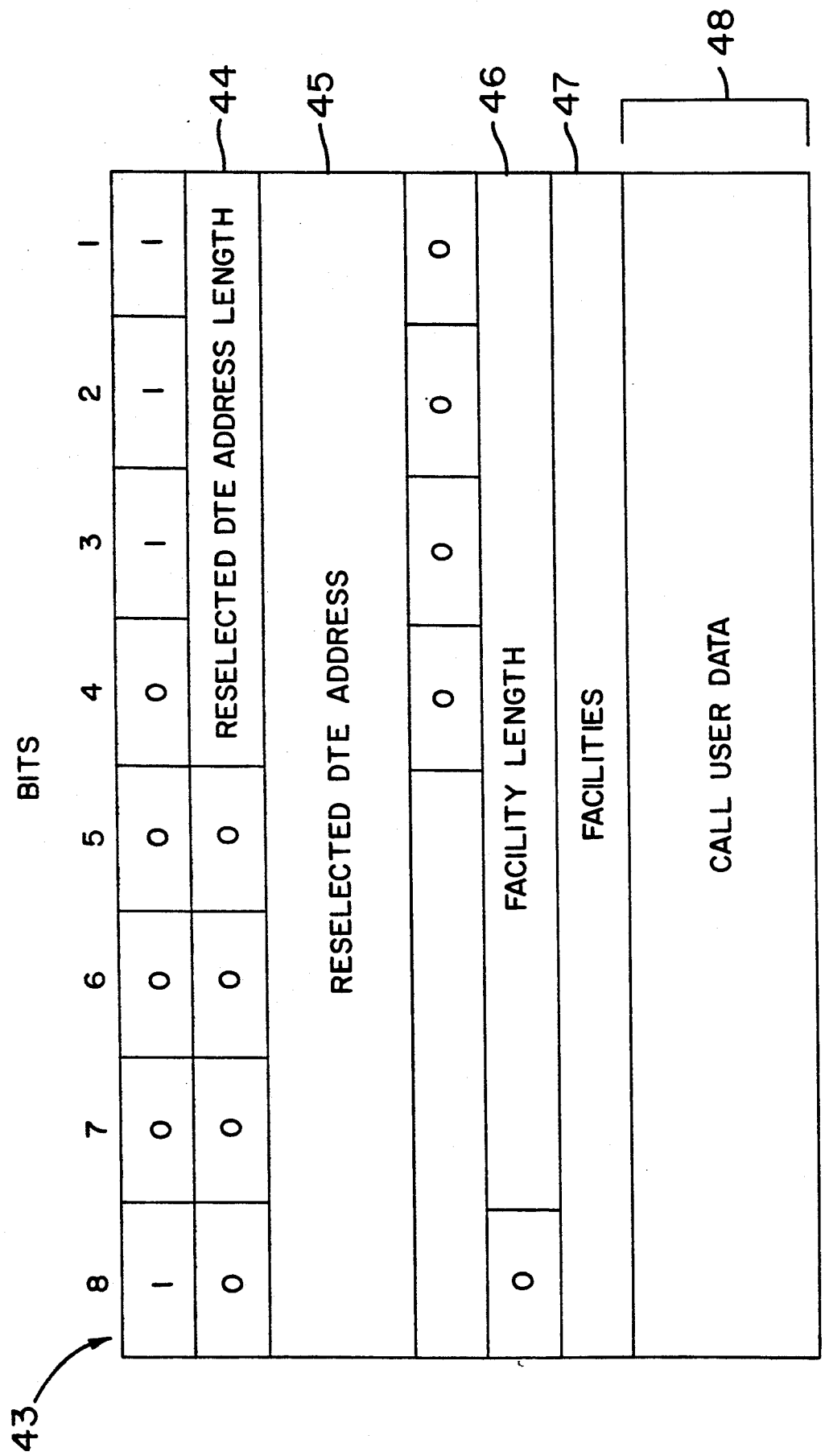
FIG. 8 shows in greater detail the call switching packet used in the communication sequence set forth in FIG. 4.

FIG. 8 shows a representative call switching packet 43 in detail. The format of the call switching packet is based upon the standard X.29 format, but the packet ID (first byte) is different from the X.29 format and has a hex value of 87. This differentiates the packet as usable for all protocols as compared to the X.29 format which is usable only for asynchronous protocols.

The call switching packet 43 contains a reselected DTE address 45. The DTE address is set by the ENFS 12 to the address of the NH 3-4 selected in step 15A. Reselected DTE address length 44 contains the length of the address in the DTE address 45 field. Facility length 46, facilities 47 and call user data 48 contain information corresponding to fields 27-29 as shown in FIG. 5.

In step 17A—The ENFAM 18 instructs the packet switch 11 to disconnect the virtual circuit between the ENFS 12 and to establish a new virtual circuit to the specified NH 3-4 based upon the DTE address 45 found in the call switching packet 43. Thereafter, while the input device 6 has a virtual circuit to the desired NH, the user, connected to the input device 6, can interact with the NH.

In step 18A—At the end of the session between the input device 6 and the NH, the virtual circuit between the two is terminated. The ENFAM 12 transmits a Call Request 19 to the ENFS 12 with the Call Marker 30 set to "01" (indicating call return). This indicates that the user already logged-on to the network and does not require a validation sequence as discussed above at step 12A.

In step 19A—The returning user interacts with the ENFS 12 and can establish a connection to yet another information provider or terminate the session with the NH.

Figure 9:
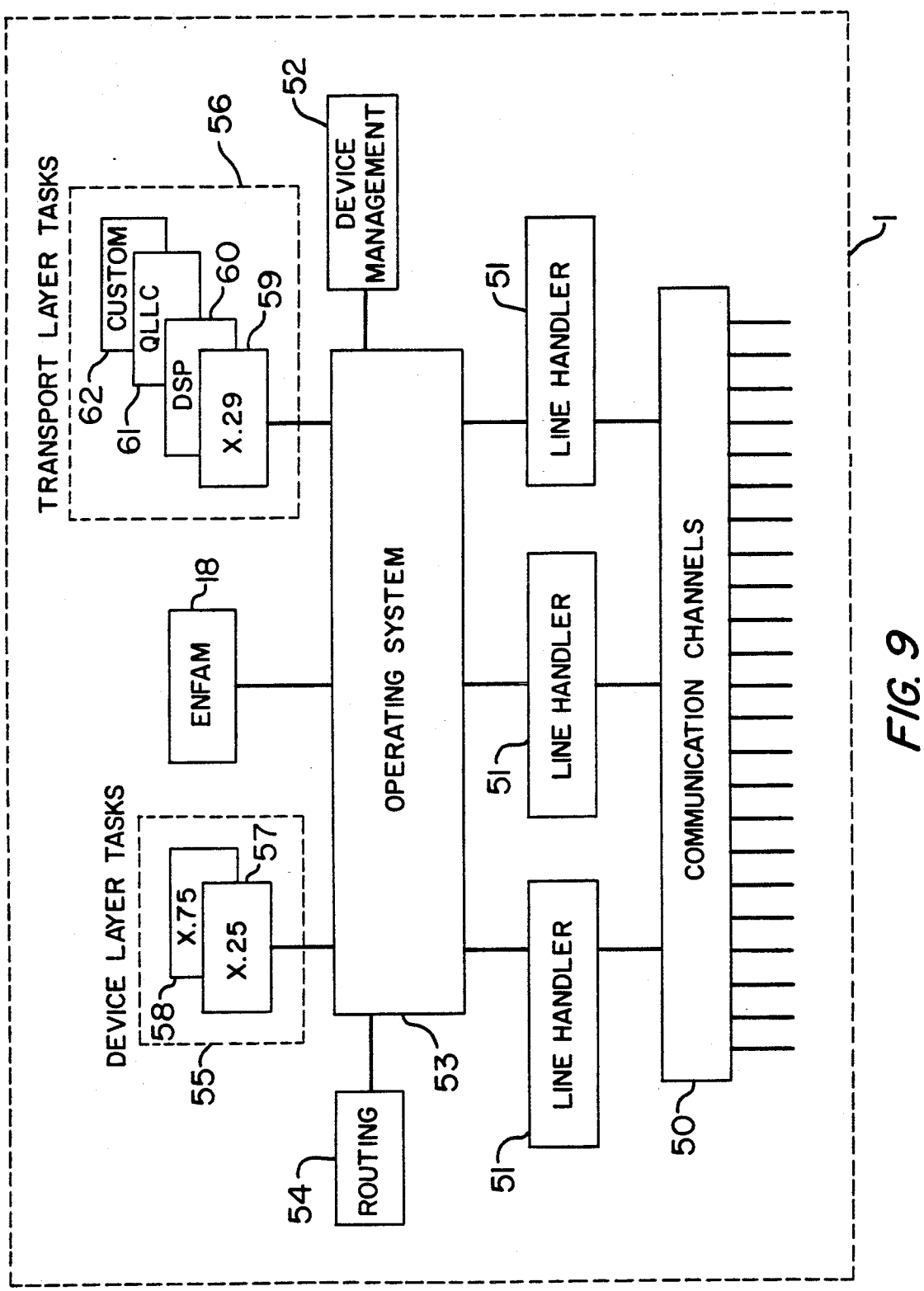
FIG. 9 shows the CP of the network of FIG. 3 in greater detail.
Figure 10:
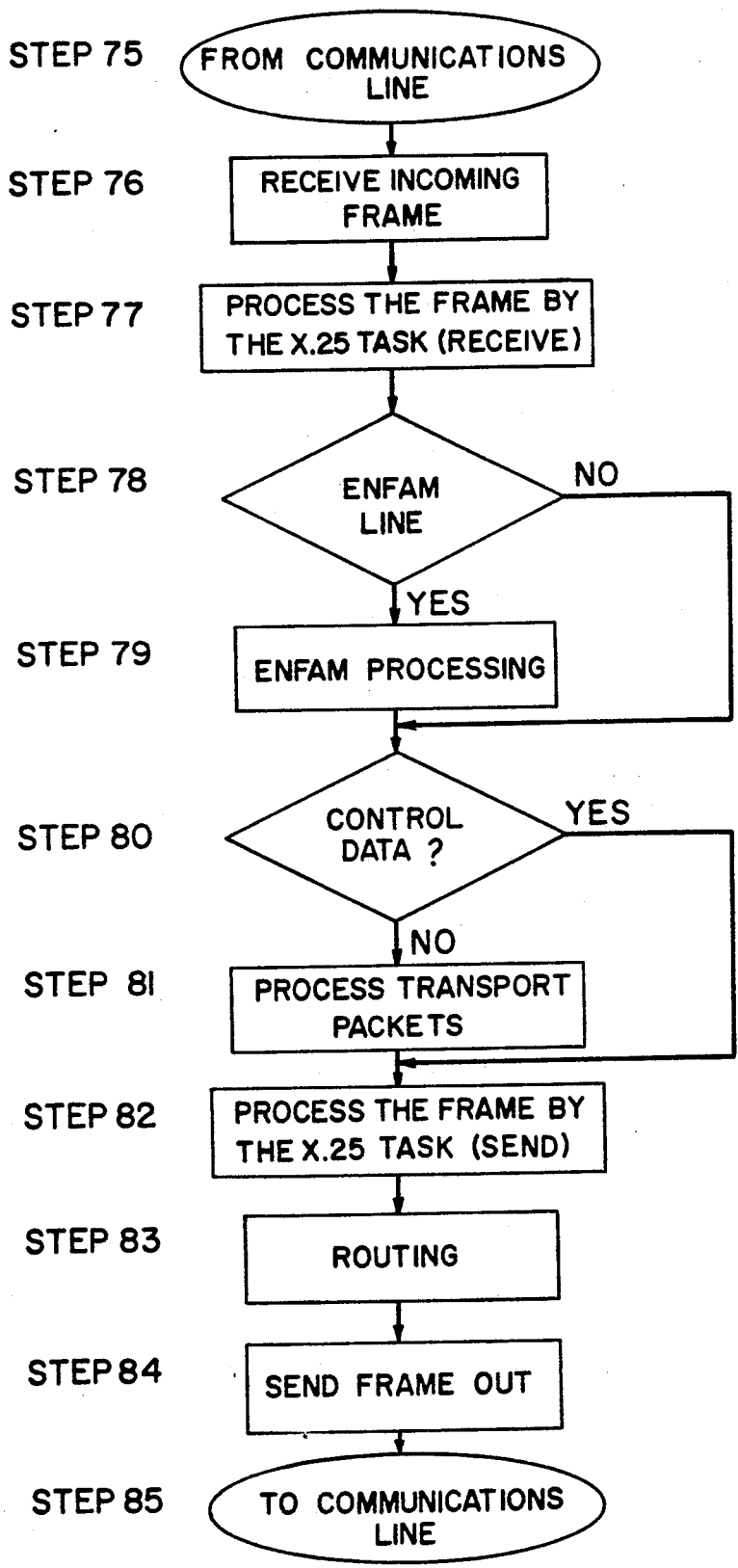
FIG. 10 is a flow chart for the operation of the CP of FIG. 9.

FIG. 9 shows the details of the CP 15 of FIG. 3 containing ENFAM 18. Line handlers 51 connect to communication channels or ports 50 which, in turn, communicate with external devices over a variety of mediums, such as, but not limited to, copper wire, fiber optics, microwave or satellite communications. An operating system 53 provides high level sequence and timing control for the various tasks to be performed by the CP. Network layer tasks 55 are provided for controlling the transmission and receipt of the network layer of the communications, for example, an X.25 task 57 and an X.75 task 58. Transport layer tasks 56 are provided for controlling the transport layer of communications, for example, an X.29 task 59. DSP task 60 provides protocol to transport 3270 BISYNCH messages over the X.25 network, QLLC task 61, provides protocol for transmitting SNA-SDLC messages over such network, and custom 62 provides protocols selected by the user. The routing task 54 controls the routing of data among the various communication ports 50. The device management task 52 performs functions related to administration of the network such as sending status information and billing records to central Network Control Center FIG. 10 describes the operation of the CP 15 and the ENFAM 18 as shown in FIG. 9 for a communication with the device 6 of FIG. 3.

In Step 75—information packets are physically received at the communications port 50.

In Step 76—the line handler 51 receives the incoming frame and informs the operating system of the presence of the frame.

In Step 77—the frame is processed by the X.25 task 57 (a network layer task 55).

In Step 78—a check is made to determine whether the communication port, on which the information packet was received from the device 6, is dedicated to input devices requiring the services of the ENFAM 18. If yes, then process proceeds at step 79. If no, process proceeds to step 80.

In Step 79—the ENFAM 18 processing occurs. The details of the ENFAM 18 processing were previously described with reference to FIGS. 3 and 4, and therefore, need not be repeated.

In Step 80—if the frame contains control information (for example, an X.29 packet) then process proceeds at step 81, if the frame contains data, then process proceeds at step 82.

In Step 81—the packet is processed by one of the transport layer tasks 56, e.g., the X.29 task 59.

In Step 82—the frame is processed by the X.25 task 57 (a network layer task 55) and is prepared to be sent.

In Step 83—the routing task 54 determines the frame destination and determines which route will be used for completing the delivery.

In Step 84—The frame is sent by the line handler 51.

In Step 85—The information physically exits through one of the communication ports 50.

It should be noted that not all input communication devices accessing the information network 10 need have access to the ENFAM 18 and, hence, the ENFS 12 and its ENFs. Thus, certain of the input ports of the access protocol sections 16A-16N can be dedicated to ENFAM access, while the remaining ports will not have access to the ENFAM and, hence, will support communication via the standard connectivity and transport functions of the packet switch 11. In such case, as indicated above, the CP 15 will identify the port of a received message and determine whether it is a port dedicated to the ENFAM or not and process the message accordingly.

It should also be noted that the CP 15 functionality in whole or in part may be located at more than one physical location in the network 10. The function may also be segmented or replicated in the network. Finally, the CP 15 function (or one or more parts thereof) may be incorporated into the packet switch 11 itself as might the functionality of the ENFS 12.

In all cases, it is understood that the above-identified arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. An information network adapted to provide communication between a number of network hosts and a number of input communication devices, each input communication device utilizing one or more of a number of different access protocols including at least first and second access protocols, said first access protocol being an asynchronous access protocol and second access protocol being other than an asynchronous access protocol, the information network comprising:

packet switch means for enabling and disabling, during a communication session, communication paths between said input devices and said network hosts;

enhanced network function means for providing enhanced network functions during operation of said packet switch means, said enhanced network functions being other than the basic transport and connectivity functions of said information network;

and enhanced network function access means for enabling said enhanced network function means to be accessed for input devices operating at least at said first and second different access protocols.

2. An information network in accordance with claim 1 wherein:

said packet switch means further enables and disables communication paths between said input devices and said enhanced network function means;

and said enhanced network function access means assists in controlling said packet switch to enable and disable said communication paths.

3. An information network in accordance with claim 1 wherein:

said enhanced network function means provides one or more of the following enhanced network functions during operation of said packet switch during a communication session: identification of the user of an input device at the beginning of a session; presentation to an input device of a menu of available network hosts; acknowledgement that a user of an input device has been previously identified during a communication session and need not be again identified; and assembling of billing information.

4. An information network in accordance with claim 3 wherein:

said enhanced network function access means is responsive to said enhanced network functions of said enhanced network function means in assisting said packet switch to enable and disable said communication paths.

5. An information network in accordance with claim 4 wherein:

said enhanced network function access means in response to a call message from a given input device identifiable as having access to said enhanced network function means controls said packet switch to enable a communication path between said given input device and said enhanced network function means.

6. A packet switch in accordance with claim 5 wherein:

if the destination address in said call message is other than the address of said enhanced network function means, said enhanced network function access means stores said address.

7. An information network in accordance with claim 5 wherein:

said enhanced network function means after a communication path is established between said enhanced network function means and said input device, obtains identification information as to the input device;

and said enhanced network function access means obtains and stores said identification information.

8. An information network in accordance with claim 7 wherein:

said enhanced network function means after a communication path is established between said enhanced network function means and said given input device, makes available information as to said network hosts;

and said information is communicated on said established communication path so as to be available to said given input device.

9. An information network in accordance with claim 8 wherein:

said given input device identifies a given network host in response to said network host information on said established communication path;

said identified network host is made available to said established communication path for said enhanced network function means;

said enhanced network function means makes said identified network host available to said enhanced network function access means;

and said enhanced network function access means instructs said packet switch means to disable the established communication path between said given input device and said enhanced network function means and to enable a further communication path between said given input device and said identified network host.

10. An information network in accordance with claim 9 wherein:

after communication with said identified network host ceases, said enhanced network function access means instructs the packet switch means to disable the communication path between the given input device and the identified network host and to reenable the communication path between the given input device the enhanced function network means; and makes available on said reenabled communication path a call request message indicating that the call is a return call.

11. An information network in accordance with claim 1 wherein:

said protocols further include one or more of X.25, X.75, BISYNC and ISDN protocols.

12. An information network in accordance with claim 1 wherein:

said packet switch means utilizes a packet switch interface protocol;

and said enhanced network function access means is included in said network on the side operating at said packet switch interface protocol.

13. An information network in accordance with claim 12 further comprising:

a communication processor including: a number of access protocol sections each associated with a different one of said access protocols and each having ports adapted to be connected to input devices utilizing the corresponding protocol; and a packet switch interface protocol section for interfacing said access protocol sections and said packet switch;

and said enhanced network function means is included in the packet switch protocol interface section of said communication processor.

14. A method of providing communication between a number of hosts and a number of input communication devices, each input communication device utilizing one or more of a number of different access protocols including at least first and second access protocols, said first access protocol being an asynchronous access protocol and said second access protocol being other than an asynchronous access protocol, said method comprising:

using a packet switch means, enabling and disabling during a communication session communication paths between said input devices and said network hosts;

providing enhanced network functions during operation of said packet switch means, said enhanced network functions being other than the basic transport and connectivity functions of an information network;

and enabling said enhanced network functions to be accessed for input devices operating at least at said first and second different access protocols.

15. A method in accordance with claim 14 wherein:

said step of enabling and disabling includes enabling and disabling communication paths between said input devices and said enhanced network function means;

and said step of enabling said enhanced network functions to be accessed includes assisting in controlling said enabling and disabling of said communication paths.

16. A method in accordance with claim 14 wherein:

said enhanced network functions include one or more of the following enhanced network functions during a communication session: identification of the user of an input device at the beginning of said session; presentation to an input device of a menu of available network hosts; acknowledgment that a user of an input device has been previously identified during a communication session and need not be again identified; and assembling of billing information.

17. A method in accordance with claim 16 wherein:

said step of assisting said enabling and disabling said communication paths includes being responsive to said enhanced network functions.

18. A method in accordnace with claim 17 wherein:

said step of enabling said enhanced network functions to be accessed includes, in response to a call message from an input device identifiable as having access to said enhanced network functions, controlling said enabling and disabling of said communications paths to enable a communication path between said input device and said enhanced network functions.

19. A method in accordance with claim 18 wherein:

if the destination address in said call message is other than the address of said enhanced network functions, said step enabling said enhanced network functions to be accessed includes storing said address.

20. A method in accordance with claim 19 wherein:

said step of providing enhanced network functions includes, after a communication path is established to an input device, obtaining and storing identification information as to the input device.

21. A method in accordance with claim 20 wherein:

said step of providing enhanced network functions includes, after a communication path is established to a given input device, making available information as to said network hosts; and communicating said information on said established communication path so as to be available to said given network device.

22. A method in accordance with claim 21 wherein:

said given input device identifies a given network host in response to said network host information on said established communication path;

said step of providing enhanced network functions includes making said identified network host available in said step of enabling said enhanced network functions to be accessed;

and said step of enabling and disabling said communication path includes disabling the established communication path between said given input device and said enhanced network functions and enabling a further communication path between said given input device and said identified network host.

23. A method in accordance with claim 22 wherein:

after communication with said identified network host ceases, said step of enabling said enhanced network functions to be accessed further includes controlling said step of enabling and disabling said communication path so that the communication path between the given input device and the identified network host is disabled and the communication path between the given input device the enhanced network functions is enabled; and making available on said reenabled communication path a call request message indicating that the call is a return call.

24. A method in accordance with claim 14 wherein:

said protocols further include one or more of X.25, X.75, BISYNC and ISDN.

* * * * *